United States Patent
Fugel et al.

(10) Patent No.: US 9,404,537 B2
(45) Date of Patent: Aug. 2, 2016

(54) AXIAL CAGE FOR CYLINDRICAL ROLLING BODIES

(71) Applicant: Schaeffler Technologies AG & Co. KG, Herzogenaurach (DE)

(72) Inventors: Wolfgang Fugel, Nuremberg (DE); Andreas Kirschner, Aurachtal (DE); Martin Gegner, Langenfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/424,641
(22) PCT Filed: Jul. 17, 2013
(86) PCT No.: PCT/DE2013/200056
§ 371 (c)(1),
(2) Date: Feb. 27, 2015
(87) PCT Pub. No.: WO2014/036997
PCT Pub. Date: Mar. 13, 2014

(65) Prior Publication Data
US 2015/0219158 A1    Aug. 6, 2015

(30) Foreign Application Priority Data
Sep. 5, 2012    (DE) .................. 10 2012 215 740

(51) Int. Cl.
F16C 33/46      (2006.01)
F16C 33/54      (2006.01)
F16C 19/30      (2006.01)

(52) U.S. Cl.
CPC ............. *F16C 33/548* (2013.01); *F16C 33/541* (2013.01); *F16C 33/546* (2013.01); *F16C 19/305* (2013.01)

(58) Field of Classification Search
CPC ...... F16C 19/305; F16C 19/54; F16C 19/541; F16C 19/543; F16C 19/546; F16C 19/6614; F16C 19/6651
USPC .......................................... 384/606, 621, 623
See application file for complete search history.

(56) References Cited

U.S. PATENT DOCUMENTS 7,866,895 B2 *   1/2011   Hayashi ................. B21D 53/12
                                                           29/898.067
7,963,703 B2 *   6/2011   Takamizawa ........... F16C 19/32
                                                           384/455

(Continued)

FOREIGN PATENT DOCUMENTS

DE            1174113         7/1964
DE            10143089        3/2003
(Continued)

OTHER PUBLICATIONS
Search Report issued in corresponding German Application No. 102012215740.9, mailed May 29, 2013.

*Primary Examiner* — Phillip A Johnson
(74) *Attorney, Agent, or Firm* — Volpe and Koenig, P.C.

(57) ABSTRACT an axial cage (1) for cylindrical rolling bodies which substantially is formed of a thin-walled washer (2) with a W-shaped profile, the individual profile legs of which are formed by an inner radial rim (3) formed on the inner edge of the washer (2), an outer radial rim (4) formed on the outer edge of the washer (2) and a U-shaped center crimp (7) connected by way of inner and outer axial profile sections (5, 6) to the radial rims (3, 4) and having the same radial extent as the rims (3, 4). A number of evenly spaced rectangular cage pockets (8) are cut from the central crimp (7) and the adjacent axial profile sections (5, 6), between which pockets an equal number of pocket webs (9) are formed connecting the rims (3, 4) with one another, by which webs the cylindrical rolling bodies (10) are retained in the cage pockets (8) at uniform distances from one another and are also guided in the circumferential direction. According to the invention, this axial cage (1) is characterized in that the outer radial rim (4) is formed with an inclination (α) facing away from the central U-shaped crimp (7) and the cage pockets (8) have an axial length greater than the smallest axial distance between the inner sides (11, 12) of the inner and the outer radial rim (3, 4) such that the cage pockets (8) extend at least into the outer radial rim (4) of the axial cage (1) and, because of a crowned formation of the outer face sides (13) towards the center of the pocket on the outer radial rim (4) of the axial cage (1) at the height of the roll axes of the rolling bodies (10), form a rounded thrust lug (14) for the outer end faces (15) of the rolling body (10).

7 Claims, 2 Drawing Sheets

(56) References Cited

U.S. PATENT DOCUMENTS

2007/0280575 A1    12/2007   Obayashi et al.
2013/0089286 A1    4/2013   Fugel et al.

FOREIGN PATENT DOCUMENTS

| | | | | |
|---|---|---|---|---|
| DE | 10326418 A1 * | 1/2004 | ............ | F16C 33/546 |
| DE | 102010019069 * | 11/2011 | .............. | F16C 19/30 |
| EP | 1657460 | 5/2006 | | |
| EP | 1657460 A2 * | 5/2006 | .......... | F16C 33/4635 |
| EP | 1818555 A1 | 8/2007 | | |
| EP | 2042756 | 4/2009 | | |
| EP | 2098738 A1 | 9/2009 | | |
| EP | 2103825 | 9/2009 | | |
| GB | 826173 | 12/1959 | | |
| JP | 2005273755 | 10/2005 | | |
| JP | 2007224977 A | 9/2007 | | |
| JP | 4165226 B2 * | 10/2008 | ............ | F16C 33/467 |
| JP | 2010053888 A | 3/2010 | | |
| JP | 2011144866 A | 7/2011 | | |
| WO | 2008088014 A1 | 7/2008 | | |
| WO | WO 2008078786 A1 * | 7/2008 | .............. | F16C 19/30 |

* cited by examiner

AXIAL CAGE FOR CYLINDRICAL ROLLING BODIES

FIELD OF THE INVENTION

The invention relates to an axial cage for cylindrical rolling bodies and it can be realized in an especially advantageous way as axial cages for axial needle bearings.

BACKGROUND

From DE 1 174 113 B1, an axial cage forming the class for an axial needle bearing is known that substantially is formed of a thin-walled washer with a W-shaped profile cross section, the individual profile legs of which are formed by an inner radial rim formed on the inner edge of the washer, an outer radial rim formed on the outer edge of the washer and a U-shaped center crimp connected by way of inner and outer axial profile sections to the radial rims and having the same radial extent as the rims. A number of evenly spaced rectangular cage pockets are cut from the center crimp and the adjacent axial profile sections, between which pockets an equal number of pocket connecting pieces are formed connecting the rims with one another, by means of which connecting pieces the rolling bodies formed as bearing needles are retained in the cage pockets and are also guided in the circumferential direction.

From practice it has been known for a long time that, during bearing operation, such axial cages cause so-called needle drilling due to the centrifugal forces acting on the bearing needles, in which the bearing needles come into frictional contact with their outer end faces on the outer corner radii of their cage pockets. This friction contact has the effect that the corner radii provided at these locations for reasons of increasing the shear strength and dimensional accuracy of the axial cage little by little are machined or worn away and it finally results in fracture or premature failure of the axial cage.

To prevent such a premature failure of the axial cage caused by needle drilling, it was proposed by DE 101 43 089 A1 to form the axial cage so that the axial cage has, at the transition area of the inner and/or the outer radial rim to the adjacent axial profile section, a circumferential bulging that transitions at the free profile end of the radial rim into a circumferential necking. This circumferential necking projects in the axial direction into the cage pockets and is in supporting contact with the end faces of the bearing needles via two contact points such that the bearing needles can no longer contact the corner radii of the cage pockets due to the influence of centrifugal forces.

In this very advantageous solution, however, it has been shown that it can be realized in terms of production only with additional expense or with completely changed processing methods. The typical processing method for producing a non-metal-cut axial cage includes, in a known way, producing this cage from an endless sheet metal strip in multiple processing steps in a stepped punching-drawing tool in which, at first, a washer connected to the sheet metal strip by way of two lateral retaining connecting pieces is punched, then the U-shaped crimp and the outer radial rim is formed into the washer, then the inner diameter of the axial cage is punched and the inner radial rim is formed on the washer, then the cage pockets are punched, and finally the outer diameter of the cage pockets is punched. At the end of the individual processing steps, the finished axial cage is still connected to the sheet metal strip merely by way of the lateral retaining connecting pieces and it is separated from this strip in a final processing step. However, if this rim has, as in the described solution, a circumferential necking that transitions into a circumferential bulging, then this separation of the finished axial cage from the lateral retaining connecting pieces is not directly possible at the rim due to the bulging arranged under the retaining connecting pieces, because otherwise this bulging would be damaged. The separation of the axial cage from the retaining connecting pieces must be realized at the inner edge of the sheet metal strip, so that the retaining connecting pieces at first remain on the separated axial cage and then must be removed with great expense using separate tools. Another possibility for creating the described axial cage would be to produce these from individual sheet metal blanks, but such a production would require expensive transport devices that transport the sheet metal blanks from one processing step to the next and thus would disadvantageously increase the costs for the production method.

Another possibility of preventing the described disadvantageous needle drilling in an axial cage was also disclosed by EP 2 103 825 A1. That publication proposes an axial cage that likewise has a U-shaped center crimp with adjacent axial profile sections, but the radial profile sections adjacent to these axial profile sections are not formed as inner and outer rims of the axial cage, but instead transition at the height of the roll axes of the bearing needles into additional inner and outer axial profile sections on which the rims extending in the opposite radial direction toward the U-shaped center crimp are formed. In this axial cage, the cage pockets extend from the outer axial profile cross section by way of the U-shaped center crimp to the inner axial profile cross section, wherein, on the outer and inner axial profile sections, within the cage pockets, two wedge-shaped sheet metal tabs are formed on the rim side, wherein these tabs come into point-wise supporting contact with the end faces of the bearing needles at the height of their roll axes due to the effect of centrifugal forces on the bearing needles.

Such a solution has also proven to be disadvantageous to the extent that the wedge-shaped sheet metal tables are arranged on additional inner and outer axial profile sections that must be formed in the axial cage and these additional axial profile sections require, in addition to increased production expense for the axial cage, also an increased axial installation space for the axial cage that in many cases is not available. In addition, the U-shaped center crimp extending radially past the inner and outer axial profile sections due to the special profiling of the axial cage in the pocket connecting pieces likewise causes production-related problems, because such axial cages are typically collected in bins after separation from the sheet metal strip for transport to their final processing. However, due to the U-shaped crimp freely projecting away from the inner and outer axial profile sections in the not-yet deburred pocket connected pieces, there is the risk that the axial cages will become hooked in each other with their pocket connecting pieces in the bins. To ensure correct and reliable further processing of the axial cages, this can be prevented only with additional stacking devices, which similarly contribute to increasing the production costs of such axial cages.

SUMMARY

Starting from the shown disadvantages of the solutions of the known prior art, the invention is based on the objective of designing an axial cage for cylindrical rolling bodies with which the known needle drilling and the associated consequences are avoided and which can be simultaneously produced economically without production-related problems according to the described typical processing methods.

According to the invention, this objective is met for an axial cage for cylindrical rolling bodies in which the outer radial rim is formed with an inclination facing away from the U-shaped center crimp and the cage pockets have an axial length greater than the smallest axial distance between the inner sides of the inner and the outer radial rim such that the cage pockets extend at least into the outer radial rim of the axial cage and, because of a crowned formation of the outer end faces towards the center of the pocket on the outer radial rim of the axial cage at the height of the roll axes of the rolling bodies, form a rounded thrust lug for the outer end faces of the rolling bodies.

Preferred construction and refinements of the axial cage formed according to the invention are described below and in the claims.

Accordingly, in one embodiment the axial cage formed according to the invention it is provided that the inclination of the outer radial rim is equal to approximately 15° relative to a vertical cage center axis, depending on the material thickness of the axial cage, the diameter of the rolling bodies, and the surrounding construction of the axial cage. Such an inclination has proven to be optimal, on one hand, for achieving a sufficient degree of shaping of the thrust lugs to be formed in the outer rim for the rolling bodies and, on the other hand, for not negatively affecting the stability or bending strength of the axial cage.

Another feature of the axial cage formed according to the invention is that the greater axial length of the cage pockets with respect to the smallest axial distance between the inner sides of the rim can be produced by a shortened formation of the length of the outer axial profile section with respect to the length of the inner axial profile cross section. In this way it is possible to form the axial cage according to the invention with the same axial width as conventional axial cages and to equip them with the same conventional rolling bodies without changes in length.

In another embodiment of the axial cage formed according to the invention is also distinguished in that it is produced according to the processing method described above in which the cage pockets are machined without metal cutting by punching, wherein their rounded thrust lugs have, due to the design of the cutting gap with a smooth cut surface of 10% to 30% of the material thickness of the axial cage, a target punched outline surface of 70% to 90% of the material thickness of the axial cage. The smooth cut surface of the thrust lugs is here machined at a right angle in the inner side of the outer radial rim of the axial cage formed with the inclination and thus is in minimal linear contact to the end faces of the rolling bodies at the height of the pocket longitudinal center. Simultaneously, the punched outline surface of the thrust lugs running from the smooth cut surface at an angle to the outer side of the rim acts as a capillary with which sufficient lubricant is always fed to this point of contact directly underneath the linear contact between this part and the end faces of the rolling bodies.

Finally, as an advantageous construction of the axial cage formed according to the invention that the clearances produced by the rounded construction of the thrust lugs of the cage pockets are provided on both sides of the linear contact between these parts and the end faces of the rolling bodies as discharge openings for excess lubricant from an axial bearing having the axial cage. This has proven especially advantageous in axial bearings that are used, for example, in a manual transmission of a motor vehicle and continuously carry a flow of lubricating oil.

In summary, the axial cage formed according to the invention thus has, with respect to the axial cages known from the prior art, the advantage that it can be formed without substantial changes to the known W-shaped profile cross section merely through a slight inclined position of its outer radial rim with rounded thrust lugs that are in linear contact with the outer end faces of the rolling bodies and thus effectively prevent needle drilling at the outer corner radii of the cage pockets in the axial cage and the associated consequences. If such needle drilling is also to be prevented at the inner corner radii of the cage pockets, it is possible to also position the inner radial rim at an angle and to form rounded thrust lugs. Simultaneously, it is possible to produce the axial cage from a sheet metal strip according to the most economical processing method, because the outer rim corresponding to the outer diameter is suitable for forming the side retaining connecting pieces to the sheet metal strip and also for separating the finished axial cage from these retaining connecting pieces directly on the outer rim.

BRIEF DESCRIPTION OF THE DRAWINGS

A preferred embodiment of the axial cage formed according to the invention will be explained in more detail below with reference to the enclosed drawings. Shown herein are.

DETAILED DESCRIPTION OF THE PREFERRED EMBODIMENTS

Figure 1:
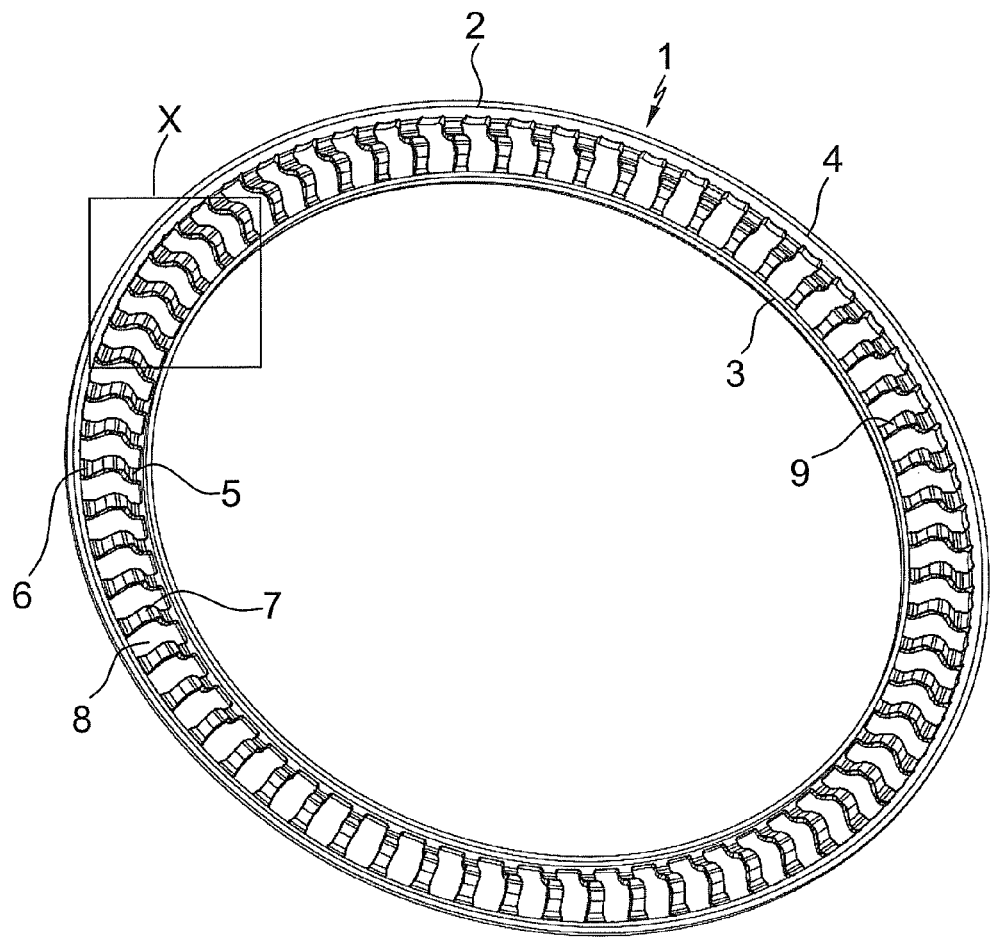
FIG. 1 a three-dimensional overall view of an axial cage formed according to the invention for an axial needle bearing, FIG. 2 an enlarged view of the detail X of the axial cage according to FIG. 1 formed according to the invention, FIG. 3 the section A-A according to FIG. 2 through the axial cage formed according to the invention.
Figure 2:
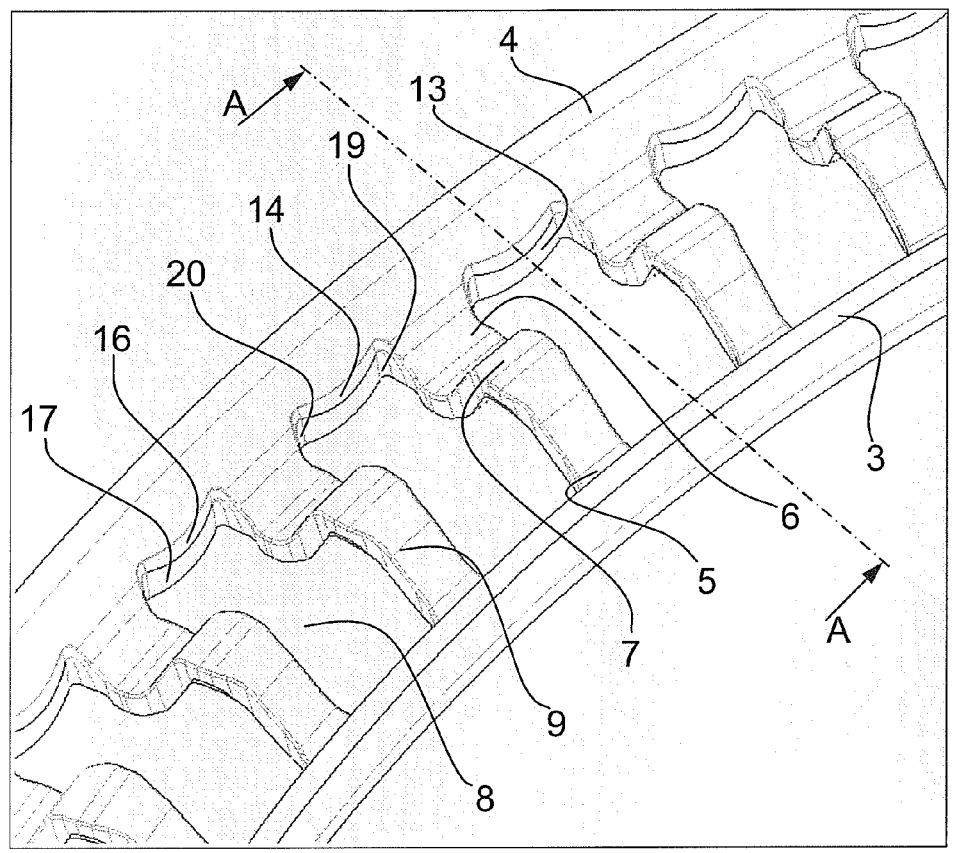
Figure 3:
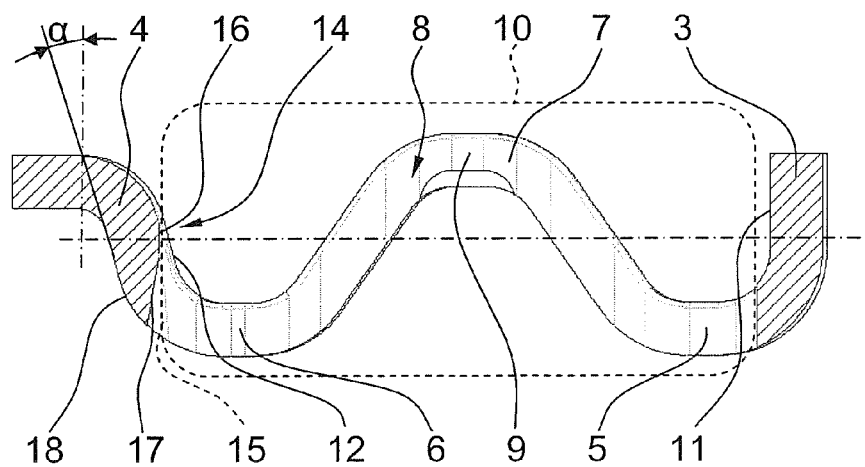

From FIG. 1, an axial cage 1 suitable for an axial needle bearing can be seen that substantially is formed of a thin-walled washer 2 with a W-shaped profile cross section that can be clearly seen especially in FIG. 3. In conjunction with FIG. 3 it can also be seen in FIG. 1 that the individual profile legs of the axial cage 1 are formed by an inner radial rim 3 formed on the inner edge of the washer 2, an outer radial rim 4 formed on the outer edge of the washer 2 and a U-shaped crimp 7 connected by way of inner and outer axial profile sections 5, 6 to the rims 3, 4 and having the same radial extent as the rims 3, 4. From FIGS. 1 and 2 it can also be clearly seen that a number of evenly spaced rectangular cage pockets 8 are cut from the crimp 7 and the adjacent axial profile sections 5, 6, between which pockets an equal number of pocket connecting pieces 9 are formed connecting the rims 3, 4 with one another, by means of which connecting pieces the cylindrical rolling bodies 10 shown in FIG. 3 and formed as bearing needles are retained in the cage pockets 8 and are also guided in the circumferential direction FIGS. 2 and 3 further show that the outer radial rim 4 is formed according to the invention with an inclination a facing away from the U-shaped center crimp 7 and the cage pockets 8 have an axial length greater than the smallest axial distance between the inner sides 11, 12 of the inner and the outer radial rim 3, 4 such that the cage pockets 8 extend at least into the outer radial rim 4 of the axial cage 1 and, because of a crowned formation of the outer end faces 13 towards the center of the pocket on the outer radial rim 4 of the axial cage 1 at the height of the roll axes of the rolling bodies 10, form a rounded thrust lug 14 for the outer end faces 15 of the rolling bodies 10.

Through the section A-A of FIG. 2 shown in FIG. 3, it is clear that the inclination a of the outer radial rim 4 is dependent on the material thickness of the axial cage 1, the diameter of the rolling bodies 10, and the surrounding construction of the axial cage 1 and is equal to approximately 15° with respect to a vertical cage center axis only suggested in the figure and the greater axial length of the cage pockets 8 with respect to the smallest axial distance between the inner sides 11, 12 of the rims 3, 4 is produced by a shortened formation of the length of the outer axial profile section 6 with respect to the length of the inner axial profile cross section 5.

Finally, from the drawings in FIGS. 2 and 3 it can also be seen that the axial cage 1 is produced from an endless sheet metal strip in a stepped punching-drawing tool and the rounded thrust lugs 14 of the punched cage pockets 8 have, due to the design of the cut gap with a smooth cut surface 16 of approx. 10%, a desired punched outline surface 17 of approx. 90% of the material thickness of the axial cage 1. The smooth cut surface 16 of the thrust lugs 14 is here machined at a right angle in the inner side 12 of the outer radial rim 4 of the axial cage 1 formed with the inclination a and is in linear contact at the height of the pocket longitudinal center with the end faces 15 of the rolling bodies 10, while the punched outline surface 17 of the thrust lugs 14 running from the smooth cut surface 16 at an angle to the outer side 18 of the rim 4 underneath the linear contact between these parts and the end faces 15 of the rolling bodies 10 is provided as a capillary for feeding lubricant to this point of contact. Simultaneously, the clearances 19, 20 produced by the rounded formation of the thrust lugs 14 are provided on both sides of the linear contact between these parts and the rolling bodies 10 as discharge openings through which excess lubricant is guided out from the axial bearing.

List Of Reference Numbers
1 Axial cage
2 Washer
3 Inner radial rim
4 Outer radial rim
5 Inner axial profile section
6 Outer axial profile section
7 Center crimp
8 Cage pockets
9 Pocket connecting pieces
10 Rolling body
11 Inner side of 3
12 Inner side of 4
13 Outer end faces of 8
14 Thrust lug on 13
15 Outer end faces of 10
16 Smooth cut surface on 14
17 Punched outline surface on 14
18 Outer side of 4
19 Clearance next to 14
20 Clearance next to 14
α Inclination angle of 4

The invention claimed is:

1. An axial cage for cylindrical rolling bodies, comprising a thin-walled washer with a W-shaped profile, individual profile legs of which are formed by an inner radial rim formed on an inner edge of the washer, an outer radial rim formed on an outer edge of the washer and a U-shaped center crimp connected by way of inner and outer axial profile sections to the inner and outer radial rims and having a same radial extent as the inner and outer radial rims, a number of evenly spaced rectangular cage pockets are cut from the center crimp and adjacent ones of the axial profile sections, between said pockets an equal number of pocket connecting pieces are formed connecting the inner and outer radial rims with one another, said connecting pieces acting to retain the cylindrical rolling bodies in the cage pockets at uniform distances from one another and to guide the cylindrical rolling bodies in a circumferential direction, the outer radial rim is formed with an inclination angle ($\alpha$) facing away from the U-shaped center crimp and the cage pockets have an axial length greater than a smallest axial distance between inner sides of the inner and the outer radial rims such that the cage pockets extend at least into the outer radial rim of the axial cage and, outer end faces of the cage pockets have a crowned formation extending towards a center of the pocket on the outer radial rim of the axial cage at a height of the rolling axes of the rolling bodies that form rounded thrust lugs for respective outer end faces of the rolling bodies.

2. The axial cage according to claim 1, wherein the inclination angle ($\alpha$) of the outer radial rim is equal to approximately 15° with respect to a vertical cage center axis.

3. The axial cage according to claim 1, wherein the greater axial length of the cage pockets with respect to the smallest axial distance between the inner sides of the inner and outer radial rims are produced by a shortened construction of a length of the outer axial profile section with respect to a length of the inner axial profile cross section.

4. The axial cage according to claim 1, wherein the cage pockets are punched, and the rounded thrust lugs have a cut surface of approximately 10%, and a target punched outline surface of approximately 90% of a material thickness of the axial cage.

5. The axial cage according to claim 4, wherein the cut surface of each thrust lug is machined perpendicular to a rolling axis of a corresponding rolling body in the inner side of the outer radial rim of the axial cage formed with the inclination angle ($\alpha$) and is at a height of the pocket longitudinal center in linear contact relative to an end face of the corresponding rolling body.

6. The axial cage according to claim 5, wherein the punched outline surface of each of the thrust lugs runs from the cut surface at an angle with respect to the outer side of the outer radial rim and is provided below the linear contact between the thrust lug and the end face of the corresponding rolling body as a capillary for feeding lubricant to the linear contact.

7. The axial cage according to claim 5, wherein clearances produced by the rounded construction of the thrust lugs of the cage pockets are provided on both sides of the linear contact between the thrust lugs and the end faces of the rolling bodies as discharge openings for excess lubricant.

* * * * *